(12) United States Patent
Doubrovsky

(10) Patent No.: US 6,883,377 B2
(45) Date of Patent: Apr. 26, 2005

(54) MEASUREMENT DEVICE INCLUDING A PRESSURE SENSOR

(75) Inventor: Gilles Louis Doubrovsky, Velizy (FR)

(73) Assignee: Regulateurs Georgin, Chatillon (FR)

( * ) Notice: Subject to any disclaimer, the term of this patent is extended or adjusted under 35 U.S.C. 154(b) by 49 days.

(21) Appl. No.: 10/162,745

(22) Filed: Jun. 6, 2002

(65) Prior Publication Data

US 2002/0189363 A1 Dec. 19, 2002

(30) Foreign Application Priority Data

Jun. 14, 2001 (FR) .............................................. 01 07794
Feb. 1, 2002 (EP) .............................................. 02290243

(51) Int. Cl.$^7$ ................................................ G01L 7/00
(52) U.S. Cl. ..................................... 73/700; 361/283.4
(58) Field of Search .......................... 73/700, 706, 715, 73/708, 723, 724; 361/763.4

(56) References Cited

U.S. PATENT DOCUMENTS 5,741,974 A    4/1998  Uemura
5,852,244 A   12/1998  Englund et al.
2004/0118213 A1 *  6/2004  Ou et al. ........................ 73/754

* cited by examiner

Primary Examiner—Edward Lefkowitz
Assistant Examiner—Andre Allen
(74) Attorney, Agent, or Firm—Oliff & Berridge, PLC

(57) ABSTRACT

The present invention relates to a measurement device for fixing to a pipe or a vessel containing a fluid, the device including a pressure sensor surrounded by a wall. The device includes a coating adhering to said wall and suitable for isolating the fluid sensor.

30 Claims, 3 Drawing Sheets

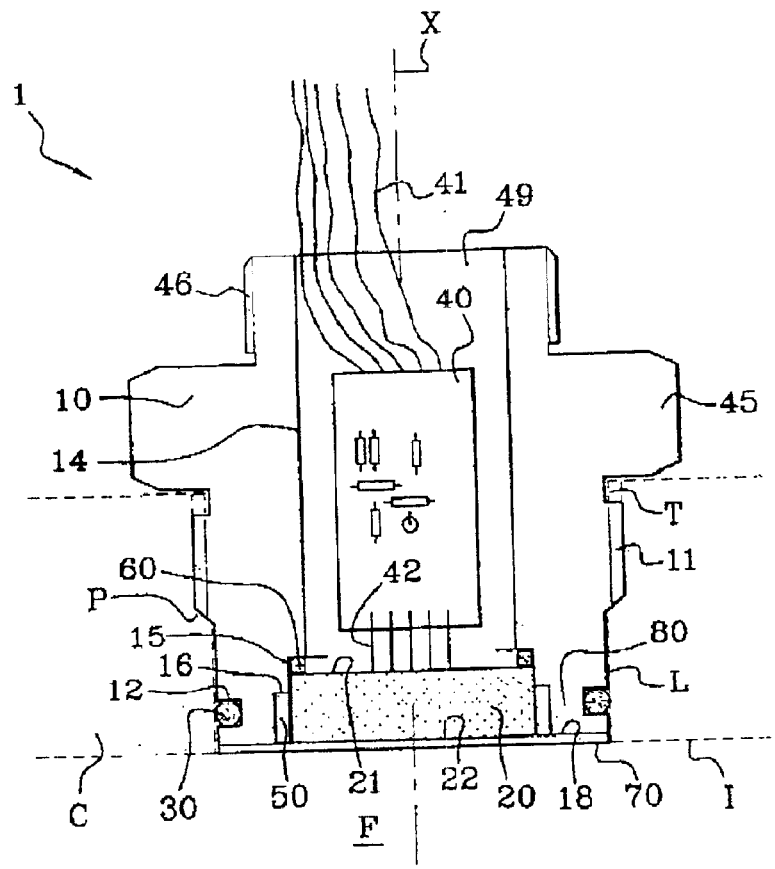
Fig. 1
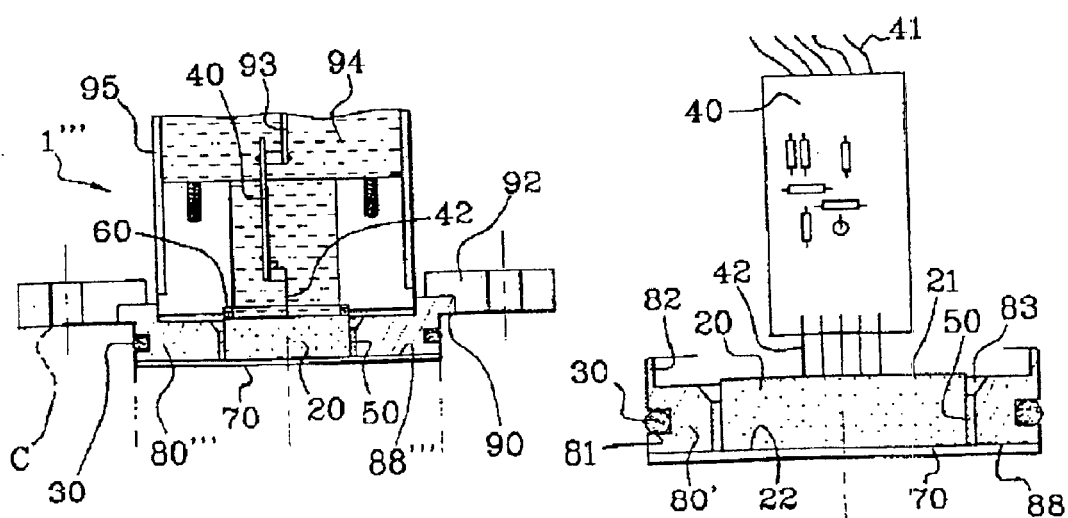
Fig. 5
Fig. 3

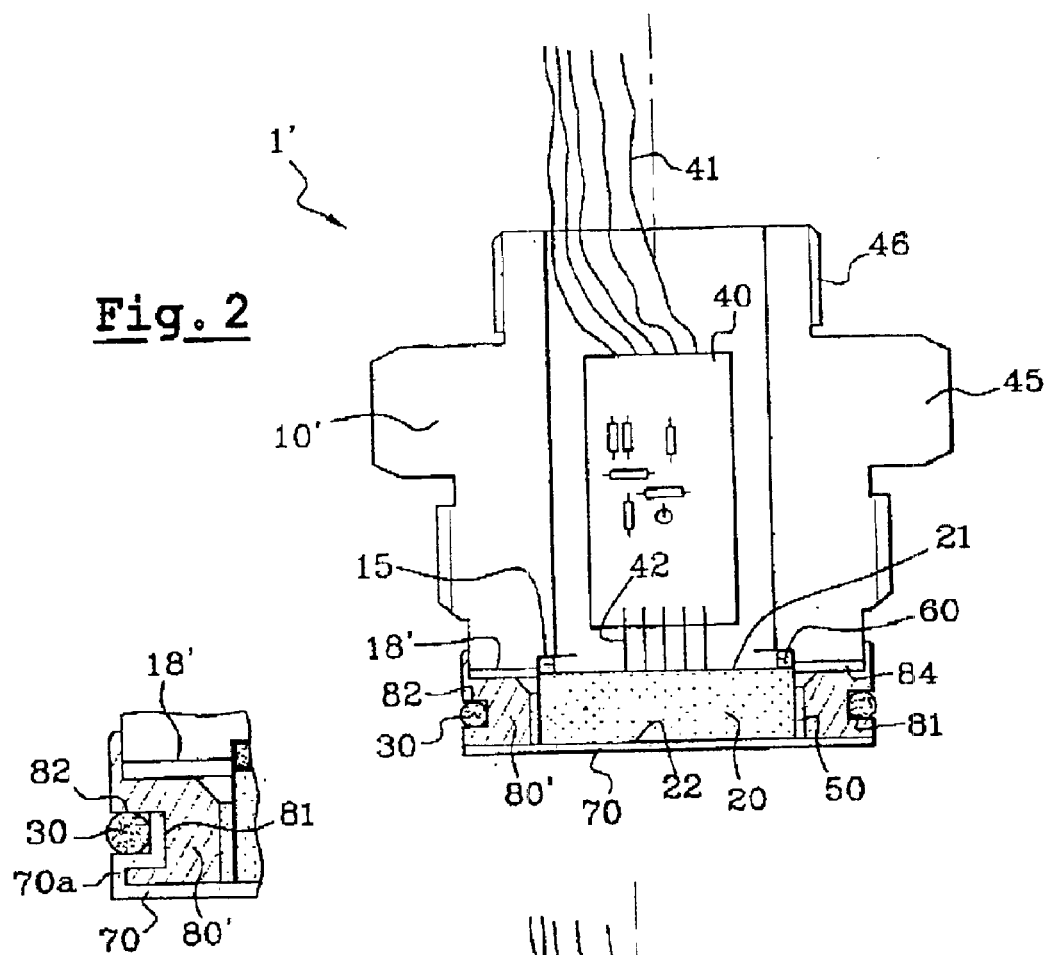
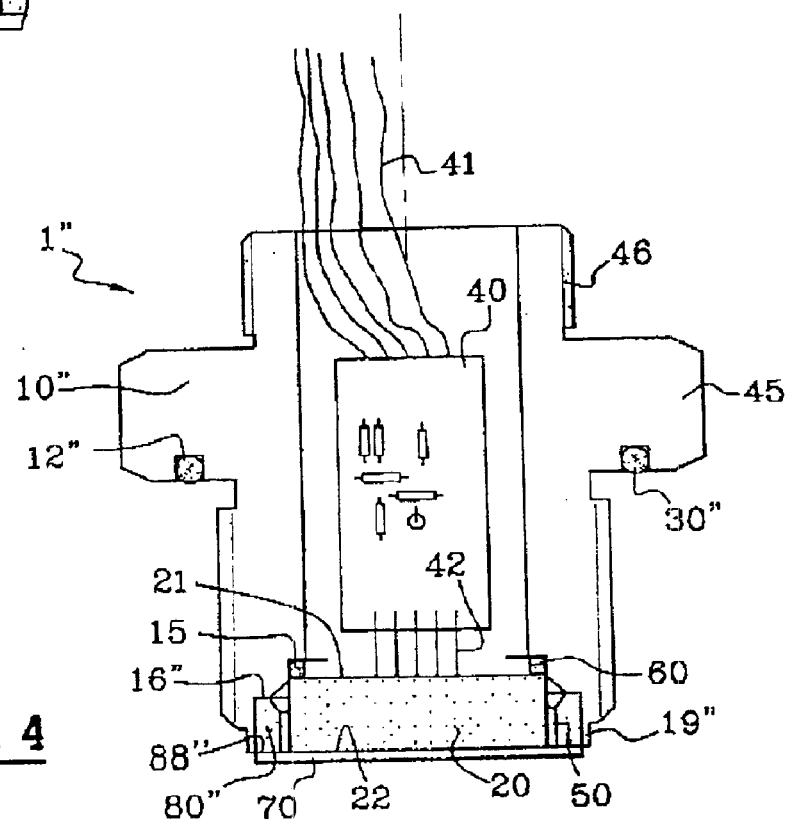

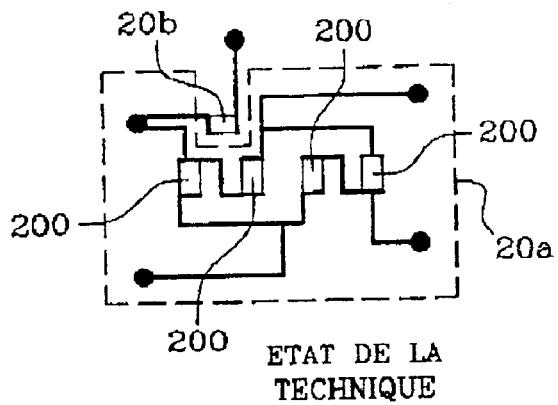
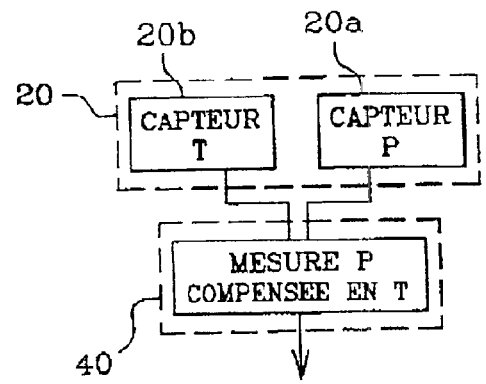
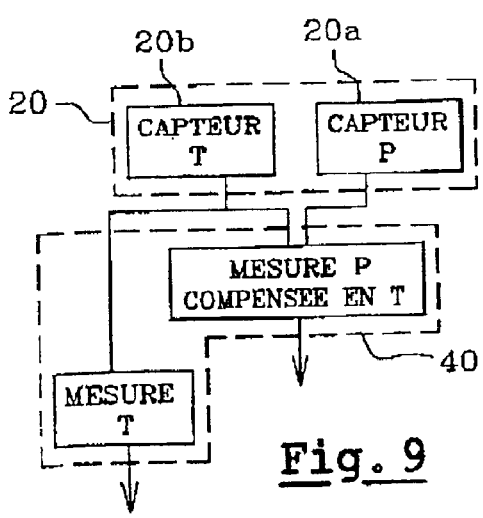
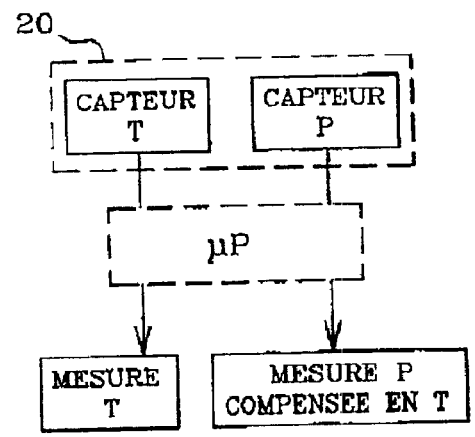
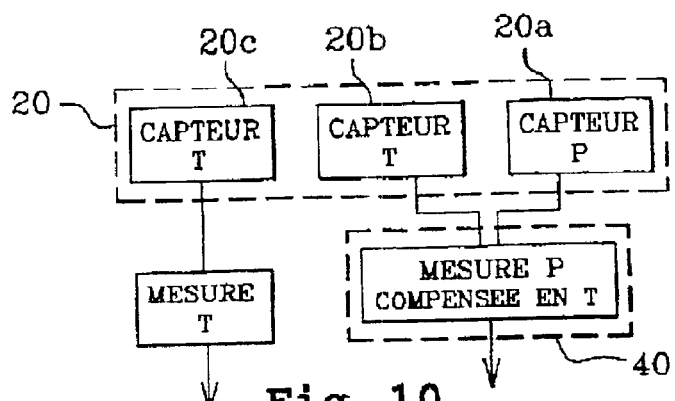

MEASUREMENT DEVICE INCLUDING A PRESSURE SENSOR

The present invention relates to measuring the pressure of a fluid, i.e. a gas or a liquid, and also where appropriate its temperature, particularly but not exclusively in the pressure range −1 bar (−$10^5$ Pascals (Pa)) to 600 bars (6×$10^7$ Pa).

BACKGROUND OF THE INVENTION

In order to measure the pressure of a fluid flowing in a pipe, it is known to use a measurement device comprising a coupling for fixing in a tapping hole in the pipe and a ceramic-diaphragm pressure sensor fixed to the coupling. The ceramic diaphragm has resistor tracks on one face that are connected as a Wheatstone bridge, as shown in FIG. 7, and the deformations of the diaphragm under the effect of pressure unbalance the bridge, with said unbalance being detected by electronic means that are suitable for generating a signal that is representative of the pressure.

Proposals have been made, in particular in the food industry, to use pressure-measuring devices in which the pressure sensor is isolated from the fluid flowing in the pipe by a stainless steel diaphragm placed so as to be flush with the inside surface of the pipe. The space between the metal diaphragm and the ceramic diaphragm of the sensor is filled with a liquid such as oil that is suitable for transmitting pressure. That solution does not provide entire satisfaction since the metal diaphragm can break and allow the pressure-transmitting liquid to escape, thereby contaminating the fluid flowing in the pipe. Furthermore, the pressure sensor can continue to operate without it being immediately apparent that the metal diaphragm has broken, since the fluid flowing in the pipe continues to exert pressure on the ceramic diaphragm. Finally, the space between the metal diaphragm and the ceramic diaphragm is relatively protected from the flow of fluid in the pipe, and that can encourage the proliferation of bacteria, and even when detected quickly that means that production must be stopped until the origin of the problem has been found, and all of the products made during the period believed to be suspect must be rejected.

U.S. Pat. No. 5,869,766 discloses a pressure-measurement device comprising a removable isolating disk of polymer interposed between the pressure sensor and the fluid flowing in the pipe. The coupling is preferably made of the same polymer as said disk. The coupling rests against a step formed in the wall of the pipe. That measurement device presents the advantage of avoiding the use of a pressure-transmitting liquid and eliminates the risks associated therewith, but it presents the drawbacks of creating a dead space in front of the isolating disk, because of the presence of the above-mentioned step, and also of being unsuitable for measuring negative pressure. Although the existence of dead space is considered as a drawback (column 10, lines 23–28), no solution is proposed for remedying that drawback, so that measurement device is ill-adapted to the food industry.

OBJECTS AND SUMMARY OF THE INVENTION

The invention seeks to propose a novel pressure-measurement device which is reliable while nevertheless being sufficiently sensitive, and which is compatible with use in the pharmaceutical or food industries, in particular.

The novel measurement device of the invention is for fixing on a pipe or a vessel containing a fluid, it comprises a pressure sensor surrounded by a wall, and it has a coating adhering to said wall and suitable for isolating the pressure sensor from the fluid.

The measurement device advantageously includes a coupling. The term "coupling" is used to mean any part that enables the measurement device to be coupled with the wall of the pipe or the vessel containing the fluid whose pressure is to be discovered. The coupling may be arranged for fixing on the wall of the pipe or the vessel by screw-fastening, welding, or adhesive, for example, and it may include a thread or a flange.

The wall of the device which surrounds the sensor is preferably annular. The term "annular wall" is used to mean a wall that is essentially continuous, defining a space enabling the sensor to be housed, the inside section not being restricted to a shape that is circular, it may optionally be non-circular, e.g. polygonal.

The invention makes it possible to use the measurement device without it being necessary for the wall surrounding the sensor to be pressed against a flange or against a step in the tapping hole in the pipe or the vessel that receives the device. The invention thus makes it possible to avoid creating a dead space in front of the measurement device because it is possible to position the outside surface of the coating flush with the inside surface of the pipe or the vessel. The device of the invention is thus entirely compatible with being used in the pharmaceutical or the food industry, in particular.

Furthermore, because of the adhesion of the coating to the sensor and to the wall of the device surrounding it, it is possible to measure a negative pressure, and that constitutes an additional advantage.

The coating used is preferably non-stick, e.g. having a coefficient of friction that is less than or equal to 0.3, more preferably less than or equal to 0.15, so as to avoid disturbing fluid flow, so as to facilitate cleaning the pipe or the vessel, and so as to reduce wear by abrasion.

In a preferred embodiment, the sensor is stuck to the inside of a ring which is fitted to the coupling. The ring preferably has an inside section that matches the shape of the sensor, and it need not be circular in shape. Such a ring increases the range of materials that can be used since the ring and the coupling need not be made of the same material. The ring can also make it easier to perform the operation of depositing the coating, since it is easier to handle than the coupling, which is bulkier. The ring is preferably made of metal, e.g. stainless steel, thus providing good adhesion for the materials suitable for use in forming the coating, and making it easy to perform surface treatment, e.g. sand blasting, to improve keying of the coating. The ring may also be made of a plastics material or a composite material. Under such circumstances, the coupling need not be made of metal. The ring may be welded to the coupling, or in a variant it may be stuck thereto with adhesive. The ring may be welded to the coupling in spite of the relative fragility of the sensor with respect to temperature, due to the presence of solder connections. When the ring is to be welded to the coupling, one of the ring and the coupling includes a thin lip which makes it possible to reduce the risk of damaging the sensor by applying high temperature. The use of a separate ring also makes it easier to fix an electronic circuit on the sensor and makes it possible to reduce the cost of manufacturing a range of measurement devices that use different couplings, by using rings that are standard for the various couplings. In addition, the presence of the ring makes it easier to align the outside face of the sensor with the end of the ring since it is possible to place the sensor and the ring on a plane surface and to introduce adhesive from behind. This is not possible when the annular ring surrounding the sensor and the coupling constitutes a one-piece assembly, in which case it is necessary to insert the adhesive from in front. Inserting adhesive from behind makes it possible to avoid a subsequent rectification operation which would otherwise be necessary. In addition, the surface on which the coating is deposited is plane so the coating can easily be made to be uniform in thickness, thus making it possible, where appropriate, to avoid disturbing measurement and to avoid complicating the processing of signals coming from the sensor.

In a particular embodiment, the separate ring carries a sealing gasket.

Still in a particular embodiment, the coupling presents a shoulder and the device has a spacer interposed between the shoulder and the sensor. The spacer makes it possible to ensure that the separate ring in which the sensor is stuck does not bear axially directly against the coupling. The shear stresses to which the adhesive is subjected when the fluid flowing in the pipe is at high pressure thus remain relatively small.

By way of example, the thickness of the coating may lie in the range 10 micrometers ($\mu$m) to 250 $\mu$m, being less than or equal to 0.2 millimeters (mm), or indeed 0.1 mm so as to avoid interfering with the sensitivity of the sensor.

The adhesive used for fixing the sensor, e.g. of the epoxy type, may include a filler, e.g. particles of aluminum.

In an aspect of the invention, the coating extends to a groove for receiving a sealing gasket, in particular an O-ring. The coating may extend specifically over at least a fraction of one side of the groove, e.g. as far as the bottom of the groove. This makes it possible to ensure that the gasket present in the groove exerts pressure on the coating and presses it against its backing, thus reducing the risk of the coating separating. This also makes it possible to isolate the ring completely from the fluid.

In another aspect, the invention provides a measurement device comprising a pressure sensor surrounded by a wall, the device further comprising at least one temperature sensor and a coating adhering to the wall suitable for isolating the pressure sensor and said at least one temperature sensor from the fluid.

The temperature sensor may be used to compensate for the temperature drift of the resistors of the pressure sensor. By way of example, the temperature sensor may be constituted by a positive temperature coefficient (PTC) or by a negative temperature coefficient (NTC) resistor element.

In a particular embodiment, the measurement device may comprise, in addition to the pressure sensor, two temperature sensors, one of the temperature sensors being for compensating the drift of the resistors of the pressure sensor as a function of temperature, and the other temperature sensor being for delivering information representative of the temperature of the fluid. Such a device enables the temperature of the fluid to be measured in relatively accurate manner, because the temperature sensor can be placed close to the fluid, being thermally insulated from the fluid to a small extent only since the thickness of the coating is relatively small and the coating is directly in contact with the fluid.

The invention also provides a method of measuring the temperature of the fluid, the method comprising the following steps:

measuring the temperature of the fluid in a pipe or a vessel containing said fluid by using a measurement device comprising a ceramic diaphragm pressure sensor having a coating adhering thereto that is suitable for isolating the sensor from the fluid, the measurement device further comprising at least one temperature sensor close to the pressure sensor, the fluid temperature being measured with said at least one temperature sensor.

The temperature sensor may be single.

The temperature sensor(s) may be fixed on the ceramic diaphragm.

The temperature sensor may be single, as mentioned above, and may serve simultaneously for measuring the temperature of the fluid and for compensating the temperature drift of the resistors of the pressure sensor.

The device may have two temperature sensors, in particular two sensors fixed to the ceramic diaphragm, one serving to measure the temperature of the fluid and the other serving to compensate the temperature drift of the components constituting the pressure sensor.

The invention also provides a method of manufacturing a measurement device, the method comprising the following steps:

a) placing a pressure sensor inside a ring and placing the assembly on a plane surface; and b) introducing adhesive into the clearance that exists between the ring and the sensor while the assembly is resting on said plane surface.

In a preferred implementation in which the measurement device has a coating adhering to the ring, the method further comprises the following step:

c) once the adhesive has polymerized, applying a coating at least to the face that was previously in contact with the plane surface, the material of the ring and the material of the coating being selected in such a manner that the coating adheres to the ring, preferably sufficiently strongly to make it possible subsequently to use the device without the coating bearing against a step in a hole in a wall of a pipe or a vessel in which the device is inserted.

The ring may be fixed to a coupling after the sensor has already been provided with an electronic circuit for extending inside the coupling.

Preferably, in order to make the coating, a material is selected that presents good chemical inertness, in particular a material which does not react with the acids or bases used in the food industry, in particular caustic soda as is used for disinfecting the pipes.

It is also preferable to select a material which presents non-stick properties, in particular so as to suffer little from abrasion.

The roughness $R_a$ of the coating is preferably less than or equal to 1.6.

The coating is made of a material selected for good temperature behavior, and preferably capable of withstanding temperatures in the range −40° C. to 80° C. during storage and of being used in contact with a fluid at a temperature lying in the range −20° C. to +150° C.

Polymer materials that are suitable for making the coating include the following, this list not being limiting: Parylene® C available in particular from the American supplier PCS, and Fluorimid® 2B or ethylene chlorotrifluoroethylene (ECTFE) or fluorinated ethylene propylene (FEP), where the latter two are fluoro-polymers available from the French supplier Fluorotechnique. Elastomer materials are also suitable, in particular of the Chemraz® type, available from the supplier Green Tweed.

BRIEF DESCRIPTION OF THE DRAWINGS

The invention may be better understood on reading the following detailed description of non-limiting embodiments and implementations, and on examining the accompanying drawings which forms an integral portion of the description and in which:

FIG. 1 is a diagrammatic axial section view of a measurement device constituting a first embodiment of the invention;

FIG. 2 is a view analogous to FIG. 1, showing a variant embodiment;

FIG. 3 shows the ring of the FIG. 2 device in isolation, and fitted with the pressure sensor;

FIG. 4 is a view analogous to FIG. 1 showing another embodiment;

FIGS. 5 and 6 are diagrammatic fragmentary axial sections showing variant embodiments;

FIG. 7 is a diagram showing an example of an electrical circuit for a conventional pressure sensor; and FIGS. 8 to 11 are block diagrams showing various configurations for measuring fluid temperature by means of a device of the invention.

MORE DETAILED DESCRIPTION

Throughout the specification, including in the claims, the term "comprising a" should be understood as being synonymous with "comprising at least one", unless the contrary is specified.

FIG. 1 shows a pressure measurement device 1 comprising both a metal coupling 10 made of stainless steel, and a pressure sensor 20. The sensor 20 is known per se and comprises a ceramic diaphragm having an electrical circuit 20a for measuring pressure formed thereon, said circuit comprising resistive tracks 200 as shown in FIG. 7 and a ceramic support with tinned electrical connections passing therethrough connecting the ends of the conductor tracks made on the ceramic diaphragm with the inside face 21 of the sensor 20. The invention is not limited to a sensor of resistive type, and it can be applied to sensors of capacitive type, for example. The sensor 20 further comprises a temperature sensor comprising a temperature-sensitive resistor 20b close to the resistor tracks 200 on the ceramic diaphragm. An electronic circuit 40, e.g. an interface circuit, is fixed to the top face 21 of the ceramic support, and has connection tabs 42 soldered to the sensor 20.

In the example described, the coupling 10 is designed to be screwed into a hole P through the wall of a pipe C, the pipe being represented by dashed lines in FIG. 1. It would not go beyond the ambit of the present invention for the pipe wall to be replaced by the wall of a vessel, with the measurement device being for measuring a liquid level, for example.

The hole P has a smooth portion L and a tapped portion T, and the coupling 10 has a thread 11 for engaging in the tapped portion T. The coupling 10 presents an annular groove 12 receiving an O-ring 30 that presses against the smooth wall L of the hole P. The O-ring 30 is situated close to the inside surface I of the pipe C, and the outside diameter of the bottom portion 80 of the coupling 10, extending facing the smooth portion L, is selected so as to enable the coupling 10 to be fitted with as little clearance as possible in the hole P.

In its portion 45 extending outside the wall of the pipe C, the coupling 10 presents an outside section that is hexagonal, enabling it to be tightened using an appropriate wrench.

In the example shown, above the portion 45, the coupling 10 presents a thread 46 that is used for fixing a box (not shown) housing one or more electronic processing circuits, for example. These circuits can be connected by wires 41 to the electronic circuit 40, for example. In a variant, the thread 46 can be omitted.

The coupling 10 is pierced by a central opening 49 of axis X which houses one or more electronic circuits, and in particular the electronic circuit 40, said opening 49 being provided with two steps 15 and 16 in its bottom portion, as can be seen in FIG. 1.

The first step 16 serves to provide an annular groove around the sensor 20 for receiving a filled epoxy-type adhesive 50 enabling the sensor 20 to be secured to the coupling 10.

The second step 15 receives a spacer 60 for taking up the forces exerted on the sensor 20 along the axis X by the pressure of the fluid F flowing in the pipe C. If axial forces were not taken up in this way, then the ring of adhesive 50 would be subjected to high levels of shear stress and that would run the risk of the sensor 20 becoming detached.

The front face 18 of the coupling 10, the ring of adhesive 50, and the front face 22 of the sensor 20 are all covered by a coating 70. The coating adheres sufficiently strongly to the front face 18 of the coupling 10 to make it possible to use the measurement device 1 without the coating 70 bearing directly against a step in the hole P, contrary to that which is disclosed in above-mentioned U.S. Pat. No. 5,869,766. The coating 70 also adheres strongly in the example described to the front face 22 of the sensor 20 and to the ring of adhesive 50.

In the example described, the coating 70 is constituted by a 0.025 mm thick layer of Parylene® C.

The embodiment shown in FIG. 1 is not entirely satisfactory in that the adhesive 50 needs to be put into place around the sensor 20 from the front, which means that the sensor 20 needs to be held on the axis X of the coupling for the length of time necessary to allow the adhesive to polymerize, and also makes it necessary subsequently to rectify the front face 18 of the coupling 10 in order to eliminate the projecting bead of adhesive 50. This makes manufacture of the measurement device 1 quite complicated. Furthermore, if the sensor 20 is not exactly on the axis X of the coupling, then its front face 22 is no longer exactly in alignment with the front face 18 of the coupling 10 which makes it difficult to deposit a layer of coating 70 that is uniform in thickness. When the coating 70 is not deposited uniformly, then the performance of the sensor is liable to be affected.

The measurement device 1' of FIG. 2, which corresponds to an embodiment that is more advantageous, mitigates the above drawbacks and make manufacture much easier. The coupling 10' of the device 1' differs from the coupling 10 firstly in the absence of the step 16 and the annular groove 12, and secondly by the presence of a separate ring 80' having the sensor 20 stuck to its inside. The ring 80', shown in isolation in FIG. 3, is made of stainless steel and at its periphery it has an annular groove 81 for receiving the O-ring 30, and at its top surface it presents a thin lip 82 for covering the side surface of the coupling 10', as can be seen in FIG. 2. In the example under consideration, the lip 82 is welded to the coupling 10'. It should be observed that it is advantageous to choose to make the ring 80' out of stainless steel since in addition to stainless steel being compatible with use in the food industry, it also presents poor thermal conductivity, thus making it possible to perform welding with the coupling 10' without subjecting the sensor 20 to a temperature that is excessive, and that might damage its electrical connections.

The ring 80' also makes it easy to fix the sensor 20 precisely since it suffices to place the ring 80' and the sensor 20 on a plane surface and then to insert the adhesive 50 from behind via the opening 83. Once the adhesive has polymerized, the front face 22 of the sensor 20 lies accurately in alignment with the front face 88 of the ring 80' and no rectification is required. The above-mentioned problems, mentioned with respect to the embodiment of FIG. 1, are thus eliminated. In addition, it is very easy to put the electronic circuit 40 into place, even after the sensor 20 has been fixed to the ring 80', since the operator has easy access to the rear face 21 of the sensor 20 so long as the ring 80' has not been fixed to the coupling 10'.

On examining FIG. 2, it can be seen that there is a space 84 between the ring 80' and the facing face 18' of the coupling 10'. This space 84 makes it possible to ensure that the axial forces exerted on the sensor 20 by the pressure of the fluid F flowing in the pipe C is taken up for the most part by the spacer 60, thereby reducing the shear stresses exerted on the ring of adhesive 50 connecting the sensor 20 to the ring 80'.

The front face 22 of the sensor 20 and the front face 88 of the ring 80' are covered by the coating 70 as in the preceding embodiment.

Without going beyond the ambit of the present invention, it is possible to modify the shape of the coupling or the shape of the ring.

As an example, FIG. 4 show a pressure measurement device 1' which comprises a coupling 10'' and a ring 80'' that are of different shapes. The ring 80'' does not have a lip 82 since the ring is received in a step 16'' in the coupling 10''. At its bottom end, the coupling has a thin lip 19'' which is welded to the periphery of the ring 80''. A coating 70 is deposited so as to cover the front face 22 of the sensor 20 and the front face 88'' of the ring 80''. The coupling 10'' presents an annular groove 12'' housing an O-ring 30'' that comes to bear axially against the outside surface of the pipe.

Naturally, the invention is not limited to a configuration in which the coating 70 is flush with the inside wall of the pipe C.

By way of example, FIG. 5 shows a fragment of a measurement device 1''' in which the coating 70 is set back from the inside surface of the pipe C. Such a configuration is possible in certain industries, other than the food industry.

In the device 1''', the sensor 20 is fixed by a ring of adhesive 50 to a ring 80''' which presents a shoulder 90 for bearing against the outside surface of the pipe C. The ring 80''' houses an O-ring 30 which provides sealing for the assembly in the hole in the pipe C.

The ring 80''' is held in place by a flange 92 for bolting to the pipe C.

In the example of FIG. 5, the electronic circuit 40 is connected to a second electronic circuit 93, and the assembly is embedded in an insulating resin 94 inside a box 95.

In the examples described above, the coating 70 can be applied in numerous ways, depending on the nature of the coating and on the recommendations of its manufacturer.

The coating can extend to the side wall of the coupling or of the ring fitted thereto, without thereby going beyond the ambit of the present invention. It is also possible to deposit the coating over a fraction only of the front face 18 of the coupling 10 or on a fraction only of the front faces 88', 88'', and 88''', of the respective rings 80', 80'', and 80''', even though that is less preferred than providing complete covering.

FIG. 6 shows a detail of a variant embodiment of the FIG. 2 device in which the coating has a fraction 70a that extends into the groove 81. More precisely, in the example shown, the coating 70 extends over the entire bottom of the groove 81 and the O-ring 30 bears against the coating 70 in the bottom of the groove 81, thus contributing to improving the behavior of the coating and reducing any risk of the coating coming unstuck, while also protecting the ring 80' by isolating it from the fluid.

In the examples given above, the rings 80', 80'', or 80''' have circular inside sections, but it would not go beyond the ambit of the present invention to use a sensor 20 that is not circular, e.g. square, in which case the rings would be of corresponding inside section.

As mentioned above, the sensor 20 may further comprise a temperature sensor, e.g. in order to take account of the temperature drift of the components used for measuring pressure, as shown in FIG. 8.

It is possible to use the signal delivered by the temperature sensor 20b to provide temperature compensation for the pressure measurement and also to determine the temperature of the fluid, as shown in FIG. 9.

The sensor 20b delivers the temperature of the fluid with accuracy that is sufficient for most applications because of the low thermal inertia of the coating and of the diaphragm.

In a variant, as shown in FIG. 10, the device has a second temperature sensor 20c which is used solely for measuring fluid temperature. The sensor 20c can be present on the ceramic diaphragm beside the electrical circuit 20a, as is the sensor 20b.

The electrical circuit 20a and the temperature sensor 20b can be connected to microprocessor, microcontroller, or similar processing means, as shown in FIG. 11, and organized to deliver information representing the measured fluid temperature, e.g. in the form of a digital signal, and information representative of its pressure, after taking account of the temperature as measured by the sensor 20b.

The measurement device can be used for delivering information other than a pressure value, for example a flow rate or a level, particularly when the device is installed in the bottom of a vessel.

What is claimed is:

1. A measurement device for fixing on one of a pipe and a vessel containing a fluid, the device comprising
a pressure sensor,
a wall surrounding the pressure sensor,
a coating adhering to said wall and configured for isolating the sensor from the fluid, wherein the coating adheres sufficiently to the wall of the device to enable it to be used without the wall pressing against a step in a hole in the pipe or the vessel in which the device is inserted.

2. A device according to claim 1, wherein said wall is annular.

3. A device according to claim 1, wherein the coating is non-stick.

4. A device according to claim 1, wherein the coefficient of friction of the coating is less than or equal to 0.3.

5. A device according to claim 4, wherein the coefficient of friction is less than or equal to 0.15.

6. A device according to claim 1, wherein the coating is of uniform thickness.

7. A device according to claim 1, wherein the thickness of the coating lies in the range 10 $\mu$m to 250 $\mu$m.

8. A device according to claim 7, wherein the thickness is less than or equal to 0.2 mm.

9. A device according to claim 8, wherein the thickness is less than 0.1 mm.

10. A device according to claim 1, wherein the roughness $R_a$ of the coating is less than or equal to 1.6.

11. A device according to claim 1, wherein the coating is a polymer material.

12. A device according to claim 11, wherein the polymer material is a fluoro-polymer.

13. A device according to claim 11, wherein the polymer material is an elastomer.

14. A device according to claim 1, wherein the sensor is stuck to the inside of a ring fitted to a coupling.

15. A device according to claim 14, wherein the ring is made of metal.

16. A device according to claim 14, wherein the ring is welded to the coupling.

17. A device according to claim 14, wherein the ring is stuck to the coupling.

18. A device according to claim 14, wherein one of the coupling and the ring has a thin lip.

19. A device according to claim 14, wherein the ring carries a sealing gasket.

20. A device according to claim 1, presenting a shoulder and including a spacer interposed between said shoulder and the sensor.

21. A device according to claim 1, wherein the coating extends into a groove for receiving a sealing gasket.

22. A device according to claim 1, wherein the coating extends at least a fraction of a side of a groove.

23. A device according to claim 22, wherein the coating extends all the way to the bottom of the groove.

24. A device according to claim 1, wherein the measurement device further comprises two temperature sensors in addition to the pressure sensor, one of the temperature sensors serving to compensate for temperature drift of resistors of the pressure sensor and the other temperature sensor serving to deliver information representing the temperature of the fluid.

25. A method of manufacturing a measurement device as defined in claim 1, comprising:

a) placing a pressure sensor inside a ring and placing the assembly on a plane surface;

b) introducing adhesive into a clearance between the ring and the sensor while the assembly is resting on said plane surface; and c) once the adhesive has polymerized, applying a coating at least to the face that was previously in contact with the plane surface, the coating adhering to the ring.

26. A method according to claim 25, wherein the ring is fixed to the coupling after the sensor has previously been provided with an electronic circuit that is designed to extend inside said coupling.

27. A device according to claim 1, wherein a clearance between the pressure sensor and the wall surrounding the pressure sensor is filled with an adhesive.

28. A device according to claim 1, wherein the coating adheres to the sensor.

29. A measurement device for fixing on one of a pipe and a vessel containing a fluid, the device comprising:

a pressure sensor, a wall surrounding the pressure sensor, an adhesive filling a clearance between the pressure sensor and the wall surrounding the pressure sensor, and a coating configured for isolating the sensor from the fluid, wherein the coating adheres sufficiently to the wall of the device to enable it to be used without the wall pressing against a step in a hole in the pipe or the vessel in which the device is inserted.

30. A method of measuring the temperature of a fluid, the method comprising:

measuring the temperature of the fluid in a pipe or a vessel containing said fluid by fixing on a pipe or a vessel containing the fluid a measurement device comprising a ceramic diaphragm pressure sensor, a wall surrounding the pressure sensor, and a coating adhering to the wall and configured for isolating the sensor from the fluid, wherein the coating adheres sufficiently to the wall of the device to enable it to be used without the wall pressing against a step in a hole in the pipe or the vessel in which the device is inserted, the measurement device further comprising at least one temperature sensor close to the pressure sensor, the fluid temperature being measured with said at least one temperature sensor.

* * * * *